United States Patent
Mikami et al.

(10) Patent No.: US 9,105,283 B2
(45) Date of Patent: Aug. 11, 2015

(54) OPTICAL INFORMATION RECORDING MEDIUM

(71) Applicant: FUJIFILM CORPORATION, Minato-ku, Tokyo (JP)

(72) Inventors: Tatsuo Mikami, Odawara (JP); Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/451,609

(22) Filed: Aug. 5, 2014

(65) Prior Publication Data

US 2014/0342159 A1    Nov. 20, 2014

Related U.S. Application Data

(63) Continuation of application No. PCT/JP2013/057200, filed on Mar. 14, 2013.

(30) Foreign Application Priority Data

Mar. 30, 2012  (JP) ................. 2012-078487

(51) Int. Cl.
*G11B 7/24* (2013.01)
*G11B 7/24038* (2013.01)
*G11B 7/24024* (2013.01)
*G11B 7/26* (2006.01)
*G11B 7/2405* (2013.01)

(52) U.S. Cl.
CPC ........ *G11B 7/24038* (2013.01); *G11B 7/24024* (2013.01); *G11B 7/266* (2013.01); *G11B 7/2405* (2013.01)

(58) Field of Classification Search
CPC ............... G11B 7/24038; G11B 7/266; G11B 7/24024; G11B 7/2405
See application file for complete search history.

(56) References Cited

U.S. PATENT DOCUMENTS

| | | | |
|---|---|---|---|
| 6,314,079 B1 * | 11/2001 | Nakayama et al. | 369/284 |
| 2003/0183511 A1 * | 10/2003 | Kakuta et al. | 204/192.27 |
| 2004/0050484 A1 * | 3/2004 | Speer et al. | 156/269 |
| 2005/0142318 A1 | 6/2005 | Nakabayashi et al. | |
| 2010/0233414 A1 | 9/2010 | Ishida et al. | |
| 2011/0069603 A1 | 3/2011 | Tomekawa et al. | |
| 2011/0085437 A1 | 4/2011 | Ito et al. | |

(Continued)

FOREIGN PATENT DOCUMENTS

| | | | |
|---|---|---|---|
| JP | 10-3695 A | | 1/1998 |
| JP | 2002-092988 | * | 3/2002 |

(Continued)

OTHER PUBLICATIONS

International Search Report of PCT/JP2013/057200, dated May 28, 2013. [PCT/ISA/210], 5 pages in Japanese and English.

*Primary Examiner* — Martin Angebranndt
(74) *Attorney, Agent, or Firm* — Sughrue Mion, PLLC

(57) ABSTRACT

An optical information recording medium is provided which comprises a laminate of unit structure sheets, each including an adhesive layer configured as an intermediate layer and at least one recording layer. The unit structure sheets are each made with the recording layer and the adhesive layer formed by applying materials in one specific application direction, and the unit structure sheets in one optical information recording medium are classifiable into pairs such that application directions therefor in each pair are shifted 180 degrees from each other.

5 Claims, 5 Drawing Sheets

(56) References Cited

U.S. PATENT DOCUMENTS

| | | | |
|---|---|---|---|
| 2011/0229679 A1* | 9/2011 | Tsukuda et al. | 428/64.4 |
| 2012/0216958 A1* | 8/2012 | Hirata | 156/538 |
| 2013/0121123 A1* | 5/2013 | Sasaki et al. | 369/47.15 |
| 2013/0128715 A1* | 5/2013 | Kitahara | 369/275.1 |
| 2013/0229901 A1* | 9/2013 | Mochizuki et al. | 369/94 |
| 2014/0029403 A1* | 1/2014 | Mochizuki et al. | 369/100 |
| 2014/0120295 A1* | 5/2014 | Mochizuki et al. | 428/41.8 |

FOREIGN PATENT DOCUMENTS

| | | | |
|---|---|---|---|
| JP | 2005-209328 A | | 8/2005 |
| JP | 2010-211897 A | | 9/2010 |
| JP | 2012-022735 | * | 2/2012 |
| WO | 2009/154289 A1 | | 12/2009 |
| WO | 2010/103853 A1 | | 9/2010 |

\* cited by examiner (a)

| | Direction (°) of application of material for each unit structure sheet with respect to the direction of application of material for adhesive layer laminated on the substrate | | | | | |
|---|---|---|---|---|---|---|
| | Example 1 | Example 2 | Example 3 | Comparative Example 1 | Comparative Example 2 | Comparative Example 3 |
| Adhesive layer | 0 | 0 | 0 | 0 | 0 | 0 |
| Unit Structure Sheet 1 | 180 | 90 | 90 | 0 | 0 | 90 |
| Unit Structure Sheet 2 | 0 | 270 | 270 | 0 | 0 | 180 |
| Unit Structure Sheet 3 | 180 | 30 | 180 | 90 | 0 | 270 |
| Unit Structure Sheet 4 | 0 | 210 | 0 | 30 | 0 | 0 |
| Unit Structure Sheet 5 | 180 | 40 | 90 | 30 | 0 | 90 |
| Unit Structure Sheet 6 | 0 | 220 | 270 | 120 | 0 | 180 |
| Unit Structure Sheet 7 | 180 | 60 | 180 | 120 | 0 | 270 |
| Unit Structure Sheet 8 | 0 | 240 | 0 | 60 | 0 | 0 |
| Unit Structure Sheet 9 | 180 | 150 | 90 | 60 | 0 | 90 |
| Unit Structure Sheet 10 | 0 | 330 | 270 | 150 | 0 | 180 |
| Polycarbonate Sheet | 180 | 180 | 180 | 150 | 0 | 270 |
| Film thickness variation range (μm) Desirably 4μm or less | 3.9 | 3.9 | 3.8 | 7.0 | 10.2 | 5.9 |
| Tangential Tilt (°) Desirably 0.3° or less | 0.75 | 0.43 | 0.23 | 0.29 | 0.66 | 0.21 |

OPTICAL INFORMATION RECORDING MEDIUM

CROSS-REFERENCE TO RELATED APPLICATION(S)

This application is a continuation of International Application No. PCT/JP2013/057200 filed on Mar. 14, 2013, which claims priority from Japanese Patent Application No. 2012-078487 filed on Mar. 30, 2012 in the Japan Patent Office, the disclosures of which are herein incorporated by reference in their entirety.

BACKGROUND

1. Field

The present invention relates to an optical information recording medium.

2. Description of Related Art

In recent years, as a technique for increasing the capacity of an optical information recording medium, a three-dimensional recording scheme under which information is recorded in multiple layers in a single recording medium has been a focus of study. In an optical information recording medium designed for three-dimensional recording, typically, an intermediate layer having appropriate thickness is disposed between adjacent recording layers in order to prevent crosstalk between the recording layers.

JP 2005-209328 A (a corresponding US patent application has been published under US 2005/0142318 A1) discloses a manufacturing method for an optical information recording medium which comprises laminating pressure-sensitive adhesive sheets (unit structure sheets) each having a recording layer, in order to facilitate making of an increased number of recording layers in the optical information recording medium designed for three-dimensional recording.

SUMMARY

When a unit structure sheet as described in JP 2005-209328 A is manufactured, a web coating method would be desirable in which materials for a recording layer, an adhesive layer and any other layer are applied in one direction. However, application by such a web coating method would cause unevenness in layer thickness due to characteristic of an applicator to show up as seen in cross section taken perpendicular to its application direction. Thus, when a plurality of the unit structure sheets are laminated one on top of another with their application directions aligned with one another, the unevenness in layer thickness would build up, and disadvantageously impair the uniformity in thickness.

It would thus be desirable to improve uniformity in thickness in an optical information recording medium made up of a laminate of unit structure sheets.

In one aspect of the present invention, an optical information recording medium is provided which comprises a laminate of unit structure sheets, each including an adhesive layer and at least one recording layer, which adhesive layer is configured as an intermediate layer. The unit structure sheets are each made with the recording layer and the adhesive layer formed by applying materials in one specific application direction. The unit structure sheets in one optical information recording medium are classifiable into pairs such that application directions therefor in each pair are shifted 180 degrees from each other.

With this configuration, even if each unit structure sheet suffers from unevenness in thickness derived from application by the web coating method, the unevenness in thicknesses of the unit structure sheets in each pair cancels each other out because the application directions for the unit structure sheets in each pair are shifted 180 degrees from each other. Therefore, even when a great number of unit structure sheets are laminated, the unevenness will not build up, and the uniformity in thickness in the optical information recording medium as a whole is improved. The phrase "applying materials in one specific application direction" used herein means "applying materials straight in one direction".

It is to be understood that not all the intermediate layers in the optical information recording medium should be adhesive layers, and if at least a subset, more than one, of the intermediate layers is formed of adhesive layers, it would be sufficient. In other words, the unit structure sheets may each include a second intermediate layer configured as the intermediate layer but different from the adhesive layer, and this second intermediate layer may be formed by applying a material in the same one specific application direction as those in which the materials for the recording layer and the adhesive layer are applied.

In this embodiment as well, unevenness in thicknesses of the unit structure sheets in each pair cancels each other out, and thus the unevenness in thickness developed due to application by the web coating method will not build up, so that uniformity in thickness is improved.

In the above-described optical information recording medium, it may be preferable that all adhesive layers contained in the optical information recording medium are distributed into orientation-specific groups such that application directions of the material for the adhesive layers belonging to the respective orientation-specific groups have unique orientations shifted at regular intervals of a smaller-than-180-degree angle with respect to a center of the optical information recording medium, the numbers of the adhesive layers in the respective orientation-specific groups being equal to one another.

The adhesive layers have a small tensile force by which they tend to shrink in the layer and which thus tends to warp the optical information recording medium. However, if the adhesive layers in one optical information recording medium are configured as above, that is, distributed into orientation-specific groups such that application directions of the materials for the adhesive layers belonging to the respective orientation-specific groups have unique orientations shifted at regular intervals with respect to the center of the optical information recording medium and the numbers of the adhesive layers in the respective orientation-specific groups are equal to one another, the force which tends to warp the optical information recording medium is uniformly distributed around the center, with the result that warpage of the optical information recording medium can be reduced.

A cover layer having one side to which a protective layer formed by applying a material in one specific application direction was attached may have a similar force which tends to produce a warp. In an alternative embodiment of the optical information recording medium which further comprises such a cover layer, preferably, all adhesive layers contained in the optical information recording medium and the cover layer are distributed into orientation-specific groups such that application directions of the materials for the adhesive layers and the protective layer formerly attached to the cover layer belonging to the respective orientation-specific groups have unique orientations shifted at regular intervals of a smaller-than-180-degree angle with respect to a center of the optical information recording medium, the numbers of the adhesive or cover layers in the respective orientation-specific groups being equal to one another.

With this configuration, the force which tends to warp the optical information recording medium is uniformly distributed around the center, so that warpage of the optical information recording medium can be reduced.

Each of the above-described optical information recording mediums may be configured such that the unit structure sheets are laminated to each side of a substrate.

With this configuration, the recording capacity per one medium can be increased because the recording layers can be provided on the both sides of the substrate.

The above-described aspects and advantages, and other advantages and further features of the present invention will become more apparent by a detailed description of illustrative, non-limiting embodiments of the present invention which will be given below with reference to the accompanying drawings.

BRIEF DESCRIPTION OF THE DRAWINGS

FIG. 5 is a table in which the results of experiments are compiled.

DESCRIPTION OF EMBODIMENT(S)

Next, one embodiment of the present invention will be described below with reference to the drawings.

Figure 1:
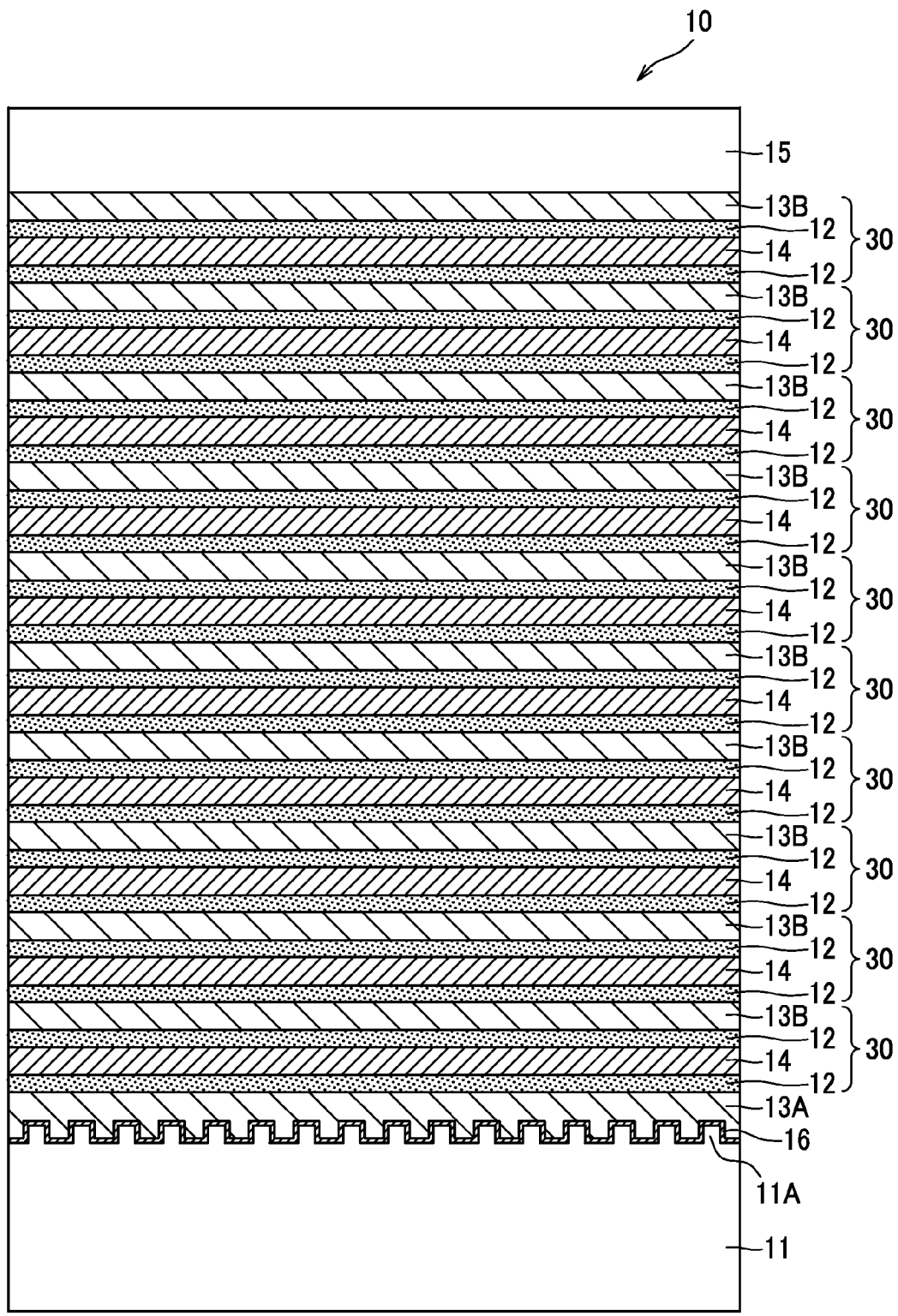
FIG. 1 is a sectional view of an optical information recording medium.

As shown in FIG. 1, an optical information recording medium 10 according to one embodiment of the present invention comprises a substrate 11, a plurality of recording layers 12, adhesive layers 13A, 13B and hard intermediate layers 14 configured as intermediate layers, a cover layer 15, and a reflective layer 16.

The substrate 11 is a supporting member for supporting the recording layer 12 and other layers, and is made of a polycarbonate disc or the like, for example. On a surface of the substrate 11, a servo signal layer 11A for tracking control or focus control is formed with projections and depressions. On a surface of the servo signal layer 11A, the reflective layer 16 is formed. It is to be understood that provision or omission of the servo signal layer 11A and the reflective layer 16 is optional.

The recording layer 12 is a layer made of a photosensitive material in which information is optically recordable; in this embodiment, the recording layer 12 contains a polymer binder and a dye dispersed in the polymer binder. Alternatively, the recording layer 12 used herein may contain a polymer binder to which a dye is bonded, instead of a polymer binder with a dye dispersed in the polymer binder. Such a recording layer 12 containing a polymer binder, preferably, has a reflectivity which does not change through recording. When the recording layer 12 is irradiated with a recording beam, the dye absorbs the recording beam and generates heat, which causes the polymer binder to deform, and causes an interface between the intermediate layer and the recording layer 12 to deform so as to form a protrusive shape protruding into the intermediate layer, so that recording spots are marked (information encoded with pits are recorded). To be more specific, a recording spot is formed such that its center becomes a protrusion-shaped portion protruding from the recording layer 12 into the intermediate layer and a portion surrounding this protrusion-shaped portion is formed as an annular recess-shaped portion recessed (as seen with reference to the recording layer 12) from the intermediate layer into the recording layer 12.

In this application, the composition of the recording layer 12 is not limited to a particular one, as long as optical recording can be done therein. For example, a recording material having a refractive index or a light absorption ratio that changes by irradiation with light may be adopted as a recording layer 12.

If the recording layer 12 is made of a recording material containing a polymer binder as described above, one recording layer 12 has a thickness in the range of 50 nm to 5 micrometers, preferably in the range of 100 nm to 3 micrometers, more preferably in the range of 200 nm to 2 micrometers. This is because a protrusive shape is unlikely to be formed at an interface between the recording layer 12 and the intermediate layer, if the thickness is less than 50 nm. The upper limit of the thickness of the recording layer 12 is not limited to a specific value; however, to increase the number of the recording layers 12, it is preferable that the recording layer 12 has a thickness not more than 5 micrometers. For example, the thickness of the recording layer 12 may be 1 micrometer.

If an alternative configuration in which recording is done by making use of change in refractive index or light absorption ratio instead of making use of deformation of interface between the recording layer 12 and the intermediate layer is adopted, the thickness of the recording layer 12 may preferably be thinner than those described above.

The number of the recording layers 12 provided may be, for example, approximately in the range of 2 to 100 layers. To increase the storage capacity of the optical information recording medium 10, the more the number of the recording layers 12, the better it may be; for example, it is preferable that ten or more layers are provided.

The recording layer 12 may preferably be formed using a web coating method in which a material is applied in one direction. Examples of the material to be applied may include a liquid in which a dye material and a polymer binder are dissolved in a solvent. Examples of the solvent usable for this purpose may include dichloromethane, chloroform, methyl ethyl ketone (MEK), acetone, methyl isobutyl ketone (MIBK), toluene, hexane, and the like. The web coating method as referred to in this description may include bar coating, blade coating, roll coating, slot coating, curtain coating, slide coating, knife coating, gravure coating, and the like.

Examples of the polymer binder for use in the recording layer 12 may include polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), polyvinyl alcohol (PVA), polyvinyl benzoate, poly(vinyl pivalate), polyethylacrylate, polybutylacrylate, and the like.

Examples of the recording beam-absorbing dye for use in the recording layer 12 may include dyes (one-photon absorption dyes) which have been conventionally used as a heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used. Further, for recording beam-absorbing dyes in an optical information recording medium 10 having a plurality of recording layers 12, those which contain a multiphoton absorption dye are preferable in order to minimize adverse effects on adjacent recording layers during recording/reading processes. As an example of the multiphoton absorption dye, a two-photon absorption compound having no linear absorption in the wavelength range of the reading beam is preferable. The content of such dyes in the recording layer 12 may preferably be in the range of 1 to 80 mass %, more preferably be in the range of 5 to 60 mass %, and further more preferably be in the range of 10 to 40 mass %.

In order to prevent interlayer crosstalk across a plurality of recording layers 12, the intermediate layer is provided to form a predetermined amount of space between the adjacent recording layers 12. In this embodiment, the intermediate layers comprise adhesive layers 13A, 13B, and a hard intermediate layer 14 as one example of a second intermediate layer. The thickness of the intermediate layer is equal to or more than 2 micrometers, and may preferably be equal to or more than 5 micrometers; in this embodiment, the intermediate layer is 10 micrometers thick by way of example. The intermediate layer is preferably as thin as possible as long as the inter-layer crosstalk can be prevented; as an example, the intermediate layer may have a thickness equal to or less than 20 micrometers.

The intermediate layer is made of a material which is unreactive to irradiation with a laser beam applied during recording and reading operations. Further, in order to minimize the loss of the recording/read-back beam (the recording beam, the reading beam, and a read-back beam (a beam of light in which a read-back signal generated by irradiation with a reading beam is embedded)), it is preferable that the intermediate layer is made of a resin which is transparent to the recording beam, the reading beam, and the read-back beam. Herein, the term "transparent" indicates that the absorption ratio thereof is equal to or less than 1%.

Each adhesive layer 13A, 13B has an adhesive property with which it can be stuck to a surface of another object, and is softer than the recording layer 12 and the hard intermediate layer 14. The adhesive layer 13A, 13B is formed by the web coating method in which a material is applied in one direction.

The adhesive layer 13A is a layer for adhering the substrate 11 to another layer, and the adhesive layer 13B is a layer provided for adhering a unit structure sheet 30 which will be described below to another layer. For the adhesive layer 13A, MRI-6 (manufactured by Lintec Corporation) may be used for example; for the adhesive layer 13B, PSA14 (manufactured by Lintec Corporation) may be used for example. In the present embodiment, adhesives of different kinds are used, but the same adhesive may be used for the both layers.

Other than the aforementioned adhesives, PANACLEAN (manufactured by PANAC Co., Ltd), HITALEX (manufactured by Hitachi Chemical Co., Ltd.) or the like may also be used for the adhesive layers 13A, 13B.

Although neither the adhesive layer 13A disposed between the substrate 11 and the lowermost recording layer 12 nor the adhesive layer 13B disposed between the uppermost recording layer 12 and the cover layer 15 is an intermediate layer in the strict sense of the term because neither of them has the function of keeping space between the recording layers 12, the uppermost and lowermost adhesive layers 13A, 13B will be referred to as being included in the intermediate layers, in the present description, for the sake of convenience.

The hard intermediate layer 14 is an intermediate layer harder than the adhesive layers 13A, 13B, and is made of a light curable resin, for example. If the recording spots are formed by deformation effected at the interface between the intermediate layer and the recording layer 12, this deformation occurs at the interface between the relatively soft adhesive layer 13A, 13B and the recording layer 12, and is unlikely to occur at the interface between the hard intermediate layer 14 and the recording layer 12. The hard intermediate layer 14 is formed by the web coating method in which a material is applied in one direction.

The hard intermediate layer 14 may be of a material such as a thermoplastic resin, a heat curable resin, etc., instead of a light curable resin.

The hard intermediate layer 14 and the adhesive layers 13A, 13B are arranged alternately with a recording layer 12 sandwiched between each pair of adjacent layers. In consequence, the interfaces, at which deformation is to be effected, between the recording layers 12 and the adhesive layers 13A, 13B becomes not evenly spaced. For example, if the intermediate layers (adhesive layers 13A, 13B and hard intermediate layer 14) are 10 micrometers thick and the recording layers 12 are 1 micrometer thick, then the pitches of the interfaces at which recording spots are formed are: 10 micrometers, 12 micrometers, 10 micrometers, 12 micrometers, . . . . With this arrangement, adverse effects on the recording spots arranged adjacently in the thickness direction can be reduced.

In one embodiment in which information can be recorded by making use of deformation of the interface between the recording layer 12 and the intermediate layer, the adhesive layer 13A, 13B has a refractive index different from the refractive index of the recording layer 12. This enables reflection of the reading beam by the steep change in refractive index at the interface between the recording layer 12 and the adhesive layer 13A, 13B. The adhesive layer 13A, 13B may preferably be configured to differ moderately from the recording layer 12 in refractive index. To be more specific, it is preferable that the following inequality is satisfied:

$$0.001 < ((n2-n1)/(n2+n1))^2 < 0.04$$

where n1 represents the refractive index of the recording layer 12, and n2 represents the refractive index of the adhesive layer 13A, 13B.

Since $((n2-n1)/(n2+n1))^2$, i.e., the reflectivity, is greater than 0.001, the quantity of light reflected at the interface is large, so that a high signal-to-noise ratio is achieved in the process of reading information. On the other hand, since the reflectivity is smaller than 0.04, the quantity of light reflected at the interface is restricted to a moderate magnitude, so that the recording/read-back beam can reach deeper recording layers 12 without undergoing considerable attenuation in the recording and reading processes. This makes it possible to increase the storage capacity by providing a large number of recording layers 12.

In contrast, according to the present embodiment, deformation is unlikely to occur at an interface between the recording layer 12 and the hard intermediate layer 14, and information is not to be recorded at this interface; therefore, the recording layer 12 and the hard intermediate layer 14 may preferably have the same refractive index. With this configuration, reflection of light will not occur at the interface between the recording layer 12 and the hard intermediate layer 14, and thus recording beam and reading beam can be allowed to reach deeper layers. Herein, the same refractive index encompasses "substantially the same refractive index", that is, the recording layer 12 and the hard intermediate layer 14 may have substantially the same refractive index such that the following is satisfied:

$$((n3-n1)/(n3+n1))^2 \leq 0.001$$

where n1 represents the refractive index of the recording layer 12, and n3 represents the refractive index of the hard intermediate layer 14; that is, the reflectivity at the interface therebetween is not more than 0.001 (0.1%).

In order to adjust the refractive indices of the recording layer 12 and the intermediate layer, the composition of the materials for use in the recording layer 12 and for use in the intermediate layer may be adjusted.

To be more specific, since the material for the recording layer 12 is prepared by mixing a dye such as a two-photon absorption compound in the polymer binder, the refractive index thereof can be adjusted as desired by appropriately selecting the dye or the polymer binder having an appropriate refractive index and changing their composition ratios. The refractive index of the polymer binder varies depending on the degree of polymerization even if they have similar basic constitution. Therefore, the refractive index of the polymer binder can also be adjusted by using polymer binders with different degrees of polymerization or by adjusting the degree of polymerization of the polymer binder. Further, adjustment can be made by mixing different kinds of polymer binders. Further, a refractive index matching material (inorganic particulate and the like) may be added to adjust the refractive index.

To adjust the refractive index of the hard intermediate layer 14, a material usable for the intermediate layer 14 may be optionally added to adjust the refractive index, or the adjustment can also be made by adding a refractive index matching material (inorganic particulate and the like).

The cover layer 15 is a layer provided to protect the recording layers 12 and the intermediate layers, and is made of a material which transmits the recording/read-back beam. The cover layer 15 has an appropriate thickness in the range from several tens micrometers to several millimeters.

As will be more apparent from a description of a manufacturing method that will be given later, the optical information recording medium 10 comprises a laminate of unit structure sheets 30 each including four layers of an adhesive layer 13B, a recording layer 12, a hard intermediate layer 14 and a recording layer 12 arranged together. The layers in each unit structure sheet 30 have the same application direction of materials. In the present embodiment, the unit structure sheets 30 in the optical information recording medium 10 are configured such that the application directions in which materials for respective layers are applied when the layers are formed satisfy a specific condition. This condition is: all the unit structure sheets 30 are classifiable into pairs such that the application directions therefor in each pair are shifted 180 degrees from each other.

Figure 2:
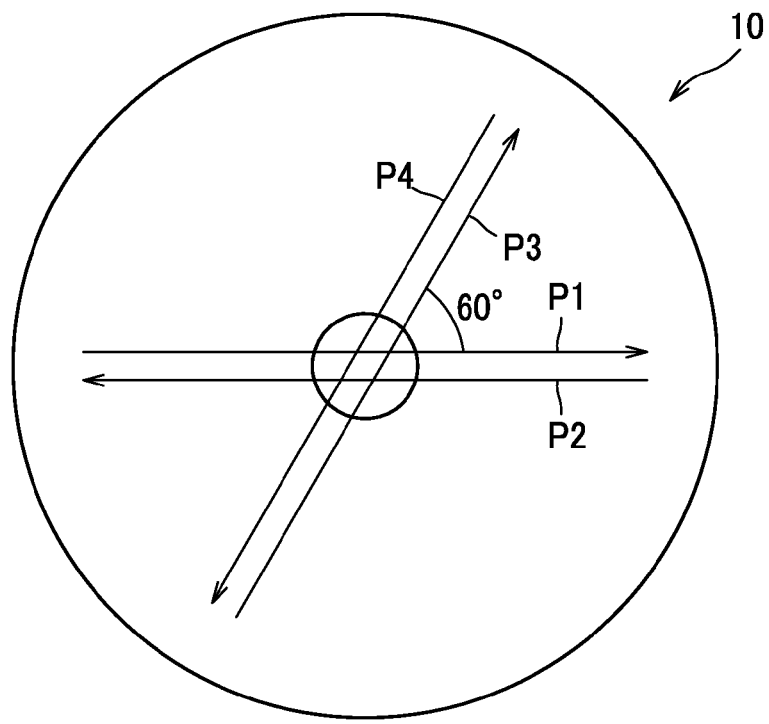
FIG. 2 includes diagrams (a), (b) for explaining application directions of a material for adhesive layers in an optical information recording medium.
Figure 2:
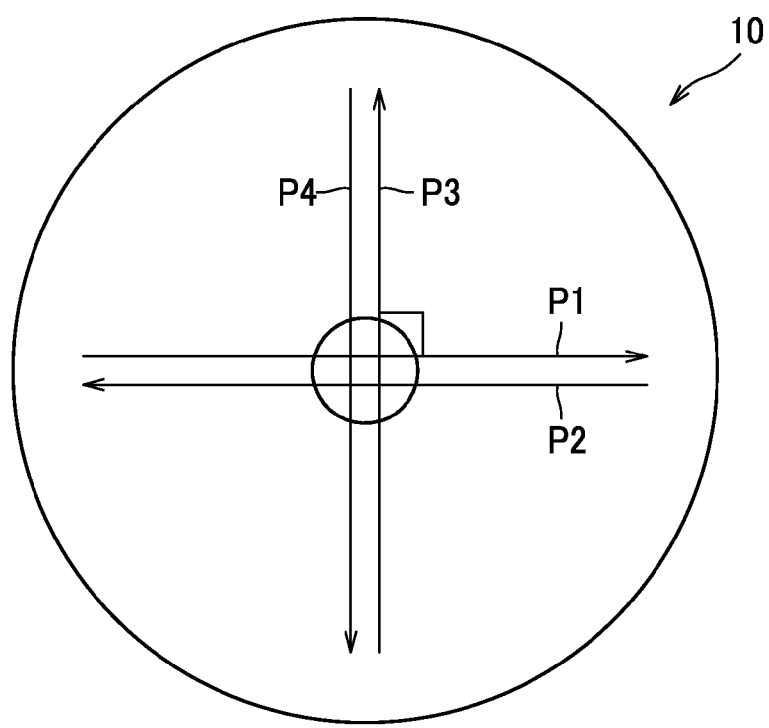

FIG. 2 is a diagram for explaining the directions in which the adhesive layers 13A, 13B are applied. For simplicity of explanation, hereinafter, an embodiment in which the total number of adhesive layers 13A, 13B provided is only four will be described. In the drawing, arrows P1-P4 indicate the directions in which tacky adhesive materials for the respective adhesive layers 13A, 13B are applied, for example, the directions in which the tacky adhesive materials are spread by using a doctor blade.

As shown in FIG. 2(a), the optical information recording medium 10 illustrated as one example has the shape of a disc, and the adhesive layers 13A, 13B therein are distributed into groups such that application directions of the tacky adhesive materials therefor orient at angles of 0°, 180°, 60°, 240°, respectively, where the application direction from the left to the right as shown in the arrow P1 is 0°. When the application directions are distributed as such, these four application directions can be classified into two pairs such that the application directions in each pair are shifted 180 degrees from each other (i.e., 0° and 180°; 60° and 240°). In this way, each adhesive layer 13A, 13B has its counterpart adhesive layer 13A, 13B such that the application directions for the layers in pair are shifted 180 degrees from each other; accordingly, even if any one of the adhesive layers 13A, 13B suffers from unevenness in thickness across the direction perpendicular to the application direction, this unevenness would be canceled out by unevenness in the counterpart adhesive layer 13A, 13B for which the application direction is shifted 180 degrees therefrom. Therefore, such unevenness would not build up, so that the uniformity in thickness in the whole optical information recording medium 10 is improved.

It is preferable that, as shown in FIG. 2(b), the adhesive layers 13A, 13B are distributed into orientation-specific groups such that application directions of the material for the adhesive layers 13A, 13B belonging to the respective groups have unique orientations shifted at regular intervals of a smaller-than-180-degree angle with respect to a center of the optical information recording medium 10, and that the numbers of adhesive layers 13A, 13B in the respective orientation-specific groups are equal to one another. In the embodiment shown in FIG. 2(b), there are four application directions, which include: 0°, 180°, 90° and 270°; these are classifiable into two pairs such that the application directions in each pair are shifted 180 degrees from each other (i.e., 0° and 180°; 90° and 270°); moreover, all application directions are distributed at regular angular intervals of 90 degrees with respect to the center of the disc-like optical information recording medium 10. It is also to be noted that in this embodiment shown in FIG. 2(b), one adhesive layer 13A, 13B is distributed in each orientation-specific group.

Since the adhesive layers 13A, 13B have a tensile stress inside, which thus tends to warp the optical information recording medium 10; however, if the adhesive layers 13A, 13B are distributed into orientation-specific groups such that application directions of the materials therefor in the groups have unique orientations shifted at regular angular intervals and the numbers of the adhesive layers in the groups are equal to one another, as shown in FIG. 2(b), then the forces toward warpage cancel one another out, so that the resulting warpage in the optical information recording medium as a whole is reduced.

In such an embodiment shown in FIG. 1 that a cover layer 15 is provided, the cover layer 15, depending on its property, would produce a force tending to warp the optical information recording medium 10. For example, the cover layer 15 may be provided with a protective layer (not shown) made of polyethylene or the like formed on a surface of the cover layer 15 (a surface at an upper side thereof in FIG. 1) by applying a material therefor in one specific application direction in order to protect that surface of the cover layer 15 during the process of manufacturing the optical information recording layer 10. In this instance, even after peeling the protective layer off the finished optical information recording medium 10, the tendency toward warpage may slightly remain in the cover layer 15. Therefore, the layers distributed into orientation-specific groups such that application directions of the materials therefor in the groups have unique orientations shifted at regular angular intervals with respect to the center of the disc-like optical information recording medium 10 and the numbers of the layers in the groups are equal to one another may, in addition to the adhesive layers 13A, 13B, preferably further include the protective layer formerly attached to the cover layer 15.

In the present embodiment, the intermediate layers comprise the adhesive layers 13A, 13B and the hard intermediate layers 14, but an alternative configuration may be feasible in which all the intermediate layers are formed with adhesive layers. In this configuration, an assembly of one adhesive layer and one recording layer may constitute a unit structure sheet (not shown).

A method for recording and reading information in the optical information recording medium 10 as described above will be described hereafter.

When information is recorded, the recording layer 12 is irradiated with a laser beam (recording beam) which is focused on a region adjacent to an interface between the recording layer 12 and the adhesive layer 13A or between the recording layer 12 and the adhesive layer 13B and of which the output is modulated in accordance with the information to be recorded. If the recording layer 12 contains a multiphoton absorption compound as a recording dye, it is preferable that the laser beam used for this recording may be a pulsed laser beam, the peak power of which can be increased.

When a recording beam is applied to the optical information recording medium 10, a center of an area on which the recording beam is applied takes a protrusive shape protruding from the recording layer 12 into the adhesive layers 13A, 13B and forms a recording spot (pit).

When information is read out from the optical information recording medium 10, a reading beam is focused on an interface between the recording layer 12 and the adhesive layer 13A, 13B and applied thereto. As the reflectivity of areas to which the reading beam is applied in this process varies depending upon the presence or absence of the recording spot, information can be retrieved from variations of the intensity of the read-back beam.

Next, a manufacturing method for an optical information recording medium 10 will be described hereafter.

Figure 3:
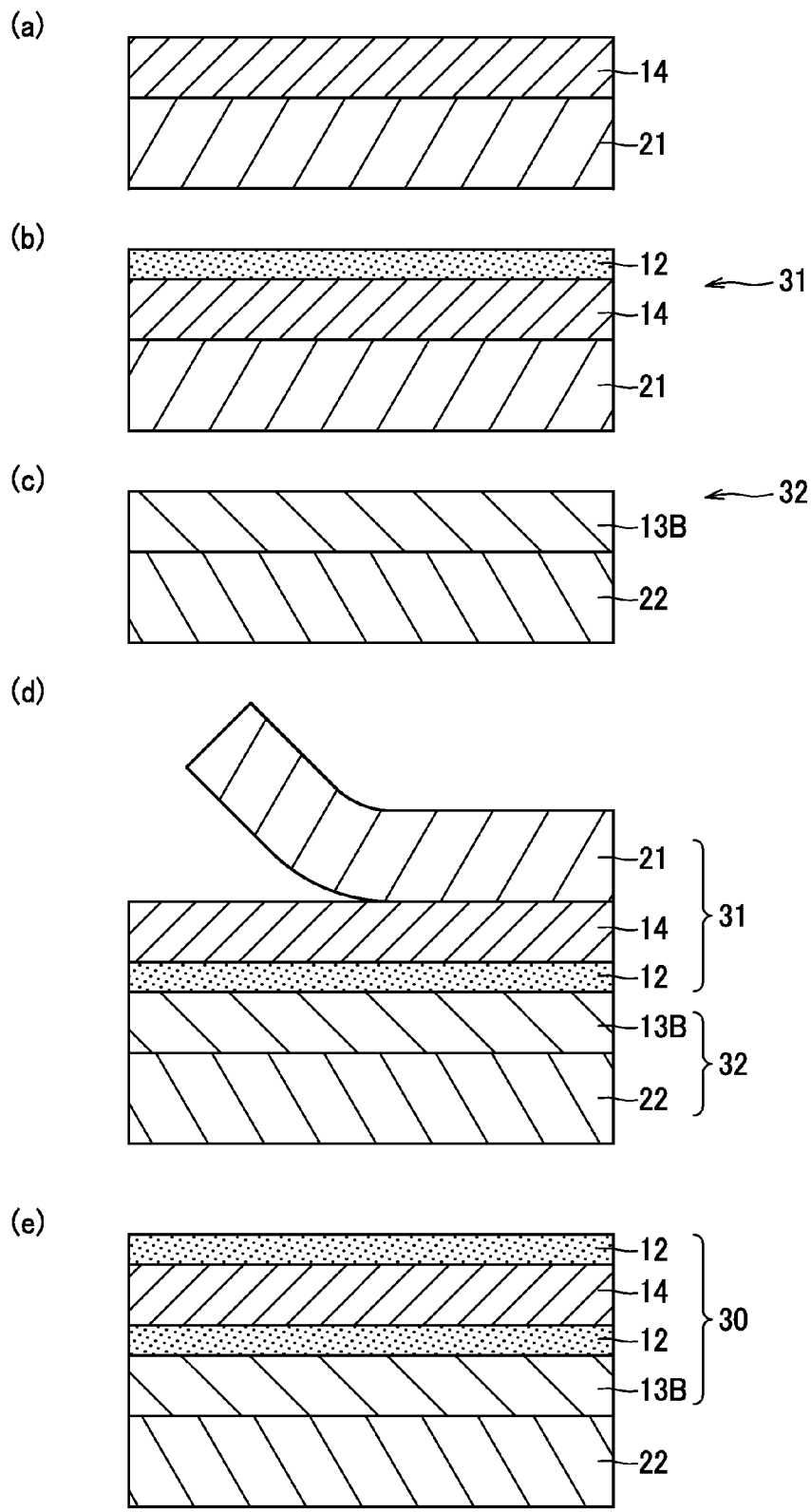
FIG. 3 includes diagrams (a)-(e) for explaining a process of manufacturing an example of unit structure sheet.

First, referring to FIG. 3, a description will be given of a process of manufacturing a unit structure sheet 30 having a multilayer structure in an optical information recording medium 10. As shown in FIG. 3(a), a light curable resin is applied onto a release film 21 by a web coating method, for example, by a bar coating method, and then irradiated and cured with ultraviolet light to form a hard intermediate layer 14. Subsequently, as shown in FIG. 3(b), a recording material is applied onto the hard intermediate layer 14 by the bar coating method to form a recording layer 12, so that a first sheet 31 is made.

On the other hand, as shown in FIG. 3(c), a material for the adhesive layer 13B is applied onto a separately prepared release film 22 by the bar coating method, so that a second sheet 32 is made.

Thereafter, as shown in FIG. 3(d), the adhesive layer 13B of the second sheet 32 is laminated on the surface of the recording layer 12 of the first sheet 31. Then, the release sheet 21 is peeled off. Next, as shown in FIG. 3(e), a recording material is applied, by the bar coating method, to the surface of the hard intermediate layer 14 exposed by peeling off the release film 21, to form a recording layer 12. Accordingly, the adhesive layer 13B, the recording layer 12, the hard intermediate layer 14 and the recording layer 12 are laminated in this sequence over the release film 22, to finally form a unit structure sheet 30 (part of the laminate which does not include the release film 22).

Figure 4:
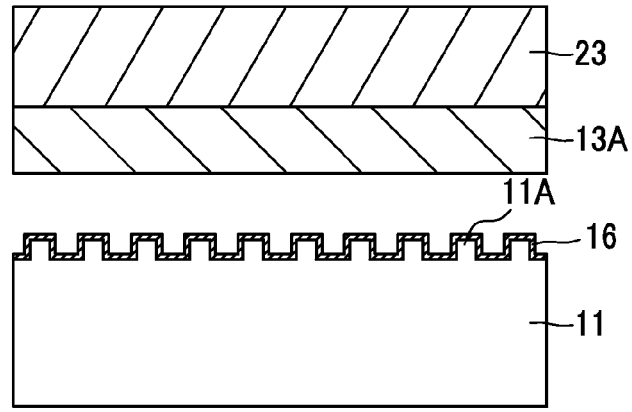
FIG. 4 includes diagrams (a)-(c) for explaining an example of process of manufacturing an optical information recording medium.
Figure 4:
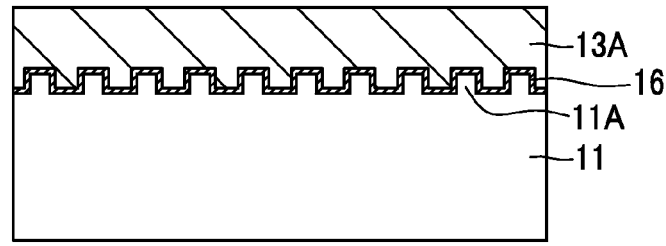
Figure 4:
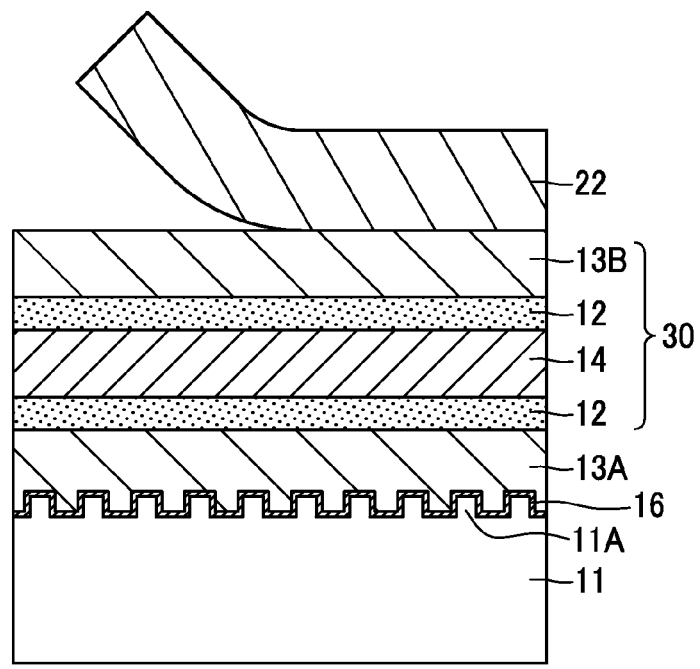

Next, referring to FIG. 4, a process of manufacturing an optical information recording medium 10 using unit structure sheets 30 will be described hereafter.

As shown in FIG. 4(a), an adhesive layer 13A is formed on a release film 23 by applying a material therefor by the bar coating method. On the other hand, a substrate 11 in which a servo signal layer 11A is formed by using a stamper is made. On the servo signal layer 11A, a reflective layer 16 is formed. Then, the adhesive layer 13A is laminated on the servo signal layer 11A, and the release film 23 is peeled off (see FIG. 4(b)).

Next, as shown in FIG. 4(c), the unit structure sheet 30 is laminated on the adhesive layer 13A by laying the recording layer 12 thereof on the adhesive layer 13A on the substrate 11. In this way, two recording layers 12 and two intermediate layers (hard intermediate layer 14 and adhesive layer 13B) are formed. In this lamination step, lamination is carried out such that the application direction of respective layers of the unit structure sheets 30 are shifted 90 degrees from the application direction of the adhesive layer 13A.

When the uppermost release film 22 is removed, the adhesive layer 13B is exposed on the top. Thereafter, a unit structure sheet 30 is laminated by laying the recording layer 12 thereof on the adhesive layer 13B exposed on the top, so that further two recording layers 12 and two intermediate layers are formed. In this step, the unit structure sheet 30 is laminated with its application direction shifted a predetermined angle, e.g., 180 degrees, from that of the lower unit structure sheet 30 oriented when the unit structure sheet 30 was laminated on the adhesive layer 13A.

By repeating the steps of removing the release film 22 and laminating the unit structure sheet 30 with its application direction set in a predetermined orientation, with frequency (number of repetition) according to the number of recording layers 12 in the optical information recording medium 10, a large number of recording layers 12 and intermediate layers can be formed. When the unit structure sheet 30 is laminated, it is laminated with the application direction of respective layers thereof shifted a predetermined angle, for example, 90 degrees or 180 degrees, from that of the unit structure sheet 30 directly thereunder.

When the optical information recording medium 10 of FIG. 1 is manufactured, the steps of laminating the unit structure sheets 30 are repeated ten times to thereby form twenty recording layers and twenty intermediate layers.

Removal of the release film 22, followed by lamination on the exposed adhesive layer 13B, of a cover layer 15 to which a protective layer is attached, and subsequent removal of the protective layer would bring the manufacture of the optical information recording medium 10 of FIG. 1 to completion. When the cover layer 15 is laminated, the orientation of the cover layer 15 to be laminated is aligned such that the direction of application of the material from which the protective layer is formed (the direction corresponding to the direction of the length of the release film 22) is shifted 90 degrees from the direction of application of the material for the uppermost adhesive layer 13B.

When each unit structure sheet 30 is laminated, its orientation is determined such that all the unit structure sheets 30 in the completed optical information recording medium 10 are classifiable into pairs such that the directions of application of material therefor in each pair are shifted 180 degrees from each other. For example, ten unit structure sheets 30 may be so arranged that the directions of application of material for the layers of the unit structure sheets 30 form angles of 90 degrees, 270 degrees, 180 degrees, 0 degrees, 90 degrees, 270 degrees, 180 degrees, 0 degrees, 90 degrees, 270 degrees with the direction of application of material for the adhesive layer 13A. In this instance, there are three pairs of 90 degrees and 270 degrees, and two pairs of 0 degrees and 180 degrees, so that all the adhesive layers 13A, 13B are classifiable into the pairs of 90 degrees and 270 degrees, and the pairs of 0 degrees and 180 degrees.

Since the application directions of the materials for the adhesive layers 13A, 13B and the protective layer formerly attached to the cover layer 15 are oriented at regular angular intervals of 90 degrees, and there are three adhesive or cover layers 13A, 13B, 15 for each direction, the warpage which would be likely to occur in the optical information recording medium 10 can be reduced.

As described above, according to the method for manufacturing an optical information recording medium 10 in this embodiment, an optical information recording medium 10 having a uniform thickness can be manufactured through a simple and mass-producible process, and the warpage in the optical information recording medium can be reduced.

Although one exemplary embodiment of the present invention has been described above, the present invention is not limited to the above-described embodiment, and can be practiced in an appropriately modified mode.

For example, the number of the recording and intermediate layers is not limited to that exemplified in the above-described embodiment; distribution of the directions of the adhesive layers is also not limited to the exemplified angular interval of 90 degrees, and any combination of directions may be feasible as long as the conditions required by the claimed invention is met.

The shape of the optical information recording medium is not limited to the disc-like shape and the other shape such as a rectangular shape may be feasible.

For example, the number of the unit structure sheets 30 consistent with the present invention is not limited to four or two as exemplified in the above-described embodiment; six or eight or any other number of layers (sheets) may be feasible.

In the above-described embodiment, the unit structure sheets 30 are laminated, one on top of another, over one side of the substrate 11; the unit structure sheets 30 may be laminated to the both sides of the substrate 11. In this alternative embodiment as well, the orientations of the unit structure sheets 30 may be distributed with consideration given to the direction of application of the materials therefor as described above, and thus the unevenness in the thickness, and the warpage, of the optical information recording medium can be suppressed, and a recording capacity per one medium can be increased as the recording layers 12 can be provided at both sides of the substrate 11. Such an optical information recording medium can be manufactured by performing the above-described method at one side of the substrate 11, turning the substrate 11 upside down, and then performing the same method at the other side of the substrate 11. Recording and reading of information may be performed by reversing the optical information recording medium, or may be performed by using recording/reading units placed on both sides of the optical information recording medium, simultaneously from the both sides of the optical information recording medium.

EXAMPLES

Next, a description will be given of experiments in which the advantageous effects of the optical information recording medium consistent with the present invention have been confirmed.

[Making of a Unit Structure Sheet]

The method for manufacturing a unit structure sheet was formulated in accordance with the embodiment described above with reference to FIG. 3.

On a release film, an ultraviolet curable resin SD-6920 (manufactured by DIC Corporation) as a material for an intermediate layer was applied thereto by a bar coating method, and was irradiated to cure with an ultraviolet ray. The resulting intermediate layer (hard intermediate layer) had approximately 10 micrometers in thickness.

215 mg of recording material represented by the chemical formula below and polymethylmethacrylate 193760 (manufactured by SIGMA-ALDRICH Japan Corporation) were used as material for a recording layer; the recording layer material was mixed with 2-butanone (manufactured by Wako Pure Chemical Industries, Ltd.), stirred for 1 hour and dissolved therein, to prepare a recording layer solution.

[Chem. 1]

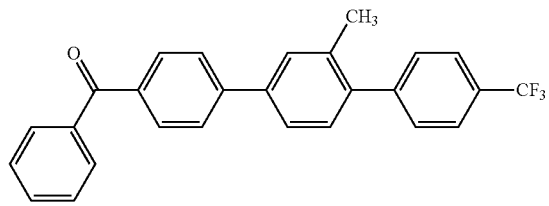

On the hard intermediate layer, the recording layer solution was applied thereto by a bar coating method, to form a recording layer of approximately 1 micrometer in thickness, so that a laminate was made.

On the other hand, on a release film, an adhesive material was applied thereto by a web coating method, to form an adhesive layer of approximately 10 micrometers in thickness. This adhesive layer was laid on the recording layer of the above laminate, and the laminate and the adhesive layer to which the release film had been attached were laminated together using a rubber roll.

The release film on the hard intermediate layer was removed, and on the exposed hard intermediate layer, a recording layer solution was applied thereto by a bar coating method, to form a recording layer of approximately 1 micrometer in thickness, so that a unit structure sheet was made.

All the layers mentioned above were formed by applying the respective materials in the same direction.

[Making of an Optical Information Recording Medium]

As a substrate, a polycarbonate disc-like substrate having a thickness of 1 mm and a diameter of 120 mm was prepared. On the substrate, DC sputtering was performed by the sputtering equipment S-500 (manufactured by Shibaura Mechatronics Corporation) using an Ag-alloy target GDO2 (manufactured by Kobelco Research Institute, Inc.), to form a reflective layer of 5 nm in thickness.

Material for an adhesive layer was applied by a web coating method to a release film and another release film was attached thereto, to prepare an adhesive layer of approximately 10 micrometers in thickness, and the resulting adhesive layer sandwiched between the release films was stamped into the same shape as that of the substrate. Then, one release film was removed therefrom, and the adhesive layer was laminated on the substrate using the lamination device HAL320 (manufactured by Sankyo Co., Ltd.). Thereafter, the other release film on the adhesive layer was removed.

On the other hand, a unit structure sheet was stamped into the same shape as that of the substrate, and the adhesive layer on the substrate and the recording layer of the unit structure sheet were joined together to laminate the unit structure sheet on the adhesive layer. Removal of the release film of a unit structure sheet and lamination of the unit structure sheet were repeated ten times, and a polycarbonate sheet D-67 (manufactured by Teijin Chemicals Ltd.) of 67 micrometers in thickness with a polyethylene laminate film (protective layer) formed on one side (outer side) thereof by a web coating method was laminated on the outermost unit structure sheet. Lastly, the polyethylene laminate film was removed, so that an optical information recording medium having twenty recording layers, similar to that shown in FIG. 1, was fabricated.

The orientations of the respective unit structure sheets and the polycarbonate sheet layer (cover layer) with respect to the direction of application of material of the adhesive layers laminated over the substrate were shown in FIG. 5.

[Measurements of Warpage of Optical Information Recording Media]

Warpage (tangential tilt) of the entire disc surface as viewed in circumferential cross section was measured using the optical disc mechanical property measurement system argus (manufactured by dr. schwab Inspection Technology GmbH). In FIG. 5, the maximum values of this warpage were shown.

[Measurements of Thickness of Optical Information Recording Media]

36-point thickness measurements were conducted for disc diameters 23 mm, 40 mm, 58 mm, respectively, using the interference type film thickness meter SI-TS10 (manufactured by Keyence Corporation). The thicknesses shown herein were distances from the surface of the polycarbonate sheet layer to the reflective layer. FIG. 5 shows the differences in thickness between the maximum and minimum values (range of variation in film thickness).

As shown in FIG. 5, in Examples 1-3, every unit structure sheet had a counterpart unit structure sheet of which the application direction was different therefrom by 180 degrees; therefore, variations in thickness canceled out between two unit structure sheets in pair, with the result that the range of variation in film thickness exhibited herein was 4 micrometers or less.

On the other hand, in Comparative Examples 1, 2, each adhesive layer had no such a counterpart of which the application direction was different therefrom by 180 degrees, and thus the variation in film thickness attributable to the adhesive layers' variation in thickness failed to cancel out, with the result that the range of variation in film thickness exhibited herein was more than 4 micrometers (desired range to be targeted). In Comparative Example 3 as well, each unit structure sheet 9, 10 had no such a counterpart by which variations in thickness could be canceled out, and thus the range of variation in film thickness was more than 4 micrometers.

In these Examples, the adhesive layers were formed with extremely high precision, and thus the variation in thickness as viewed in cross section perpendicular to the application direction was small. Therefore, in these Examples, the orientations of (application direction of material for) the adhesive layers would not affect the range of variation of the film thickness and could be negligible. It goes without saying that if any non-negligible variation in thickness of the adhesive layers showed up in cross section perpendicular to the application direction, the application direction of the material for the adhesive layers should be taken into consideration for evaluation of the variation of the film thickness, as well.

With regard to the warpage of the optical information recording medium, in Example 3 and Comparative Example 3, the application directions of material for adhesive layers and the application direction of material for the protective layer formerly attached to the polycarbonate layer were shifted at the intervals of 90 degrees, and there were three layers for each application direction, so that internal stresses toward warpage of the adhesive layer and the polycarbonate layer were distributed in good balance around the center of the optical information recording medium; as a result, the warpage was restricted within 0.3 degrees. In Comparative Example 1, layers were laminated in orientations shifted at regular intervals of 30 degrees, and there are two layers for each orientation, so that the internal stresses which tend to cause warpage in the optical information recording medium were distributed in good balance around the center of the optical information recording medium; as a result, the warpage was restricted within 0.3 degrees. The internal stresses which tend to cause warpage in the optical information recording medium are affected by the orientation of the application but not by the direction of application. For example, such internal stresses which tend to cause warpage may be the same between the case in which the application direction is 90 degrees and the case in which the application direction is 270 degrees. For example, the internal stresses which are produced by the two adhesive layers both shifted at 90 degrees and tend to cause such warpage are the same as those which are produced by the two adhesive layers shifted at 90 degrees and 270 degrees, respectively, and tend to cause such warpage.

On the other hand, in Example 1, Example 2 and Comparative Example 2, the application directions of the materials for the adhesive layers and the protective layer formerly attached to the polycarbonate layer were not shifted at the same angular interval, and thus distribution of the internal stresses which were produced by the adhesive layers and the polycarbonate layer and tended to cause warpage in the optical information recording medium became unbalanced; as a result, the warpage was not restricted within 0.3 degrees.

What is claimed is:

1. An optical information recording medium which comprises a laminate of paired unit structure sheets, each including an adhesive layer configured as an intermediate layer, and at least one recording layer,
    wherein the unit structure sheets are each made with the recording layer and the adhesive layer formed by applying materials in one specific application direction; and
    wherein two adjacent unit structure sheets in one optical information recording medium are classifiable into pairs such that application directions therefor in each pair are shifted 180 degrees from each other.

2. The optical information recording medium according to claim 1, wherein the unit structure sheets each include a second intermediate layer configured as the intermediate layer but different from the adhesive layer, the second intermediate layer being formed by applying a material in the same one specific application direction as those in which the materials for the recording layer and the adhesive layer are applied.

3. The optical information recording medium according to claim 1, wherein all adhesive layers contained in the optical information recording medium are distributed into orientation-specific groups such that application directions of the material for the adhesive layers belonging to the respective orientation-specific groups have unique orientations shifted at regular intervals of a smaller-than-180-degree angle with respect to a center of the optical information recording medium, the numbers of the adhesive layers in the respective orientation-specific groups being equal to one another.

4. The optical information recording medium according to claim 1, further comprises a cover layer having one side to which a protective layer formed by applying a material in one specific application direction was attached, wherein all adhesive layers contained in the optical information recording medium and the cover layer are distributed into orientation-specific groups such that application directions of the materials for the adhesive layers and the protective layer formerly attached to the cover layer belonging to the respective orientation-specific groups have unique orientations shifted at regular intervals of a smaller-than-180-degree angle with respect to a center of the optical information recording medium, the numbers of the adhesive and cover layers in the respective orientation-specific groups being equal to one another.

5. The optical information recording medium according to claim 1, wherein the unit structure sheets are laminated to each side of a substrate.

\* \* \* \* \*